(12) United States Patent
Sychev

(10) Patent No.: US 10,944,966 B2
(45) Date of Patent: *Mar. 9, 2021

(54) METHOD FOR DETERMINING PREDICTOR BLOCKS FOR A SPATIALLY SCALABLE VIDEO CODEC

(71) Applicant: Huawei Technologies Co., Ltd., Guangdong (CN)

(72) Inventor: Maxim Sychev, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,528

(22) Filed: Mar. 15, 2019

(65) Prior Publication Data

US 2019/0215515 A1    Jul. 11, 2019

Related U.S. Application Data

(63) Continuation of application No. 14/866,177, filed on Sep. 25, 2015, now Pat. No. 10,250,878, which is a
(Continued)

(51) Int. Cl.
*H04N 19/117*    (2014.01)
*H04N 19/56*     (2014.01)
(Continued)

(52) U.S. Cl.
CPC ......... *H04N 19/117* (2014.11); *H04N 19/176* (2014.11); *H04N 19/33* (2014.11);
(Continued)

(58) Field of Classification Search
None
See application file for complete search history.

(56) References Cited

U.S. PATENT DOCUMENTS 7,876,833 B2 *  1/2011  Segall ..................... H04B 1/66
                                                    375/240.02
8,175,158 B2    5/2012  Segall
(Continued)

FOREIGN PATENT DOCUMENTS

CN    1722838 A    1/2006
EP    2111719 B1   8/2014

OTHER PUBLICATIONS

Beermann M: "Non-linear up-sampling for spatial scalability", 20. JVT Meeting; 77. MPEG Meeting; Jul. 15, 2006-Jul. 21, 2006; Klagenfurt, AT; (Joint Video Team of ISO/IEC JTC1/SC29/WG11 and ITU-TSG.16 ), No. JVT-T020, Jul. 15, 2006 (Jul. 15, 2006), XP030006507, ISSN: 0000-0408 (Year: 2006).*

(Continued)

*Primary Examiner* — James M Anderson, II
(74) *Attorney, Agent, or Firm* — Conley Rose, P.C.

(57) ABSTRACT

The invention relates to method for determining predictor blocks of a first resolution layer image from blocks of a second resolution layer image of a spatially scalable video codec, wherein a resolution of the first resolution layer image is higher than a resolution of the second resolution layer image, the method comprising: up-scaling each block of the second resolution layer image to a corresponding block of an up-scaled second resolution layer image; and filtering each block of the up-scaled second resolution layer image by a sharpening filter to obtain a predictor block of the first resolution layer image.

20 Claims, 10 Drawing Sheets

Related U.S. Application Data continuation of application No. PCT/RU2013/000258, filed on Mar. 28, 2013.

(51) Int. Cl.

| | | |
|---|---|---|
| *H04N 19/50* | (2014.01) | |
| *H04N 19/70* | (2014.01) | |
| *H04N 19/82* | (2014.01) | |
| *H04N 19/33* | (2014.01) | |
| *H04N 19/176* | (2014.01) | |
| *H04N 19/40* | (2014.01) | |
| *H04N 19/52* | (2014.01) | |

(52) U.S. Cl.
CPC ............. *H04N 19/40* (2014.11); *H04N 19/50* (2014.11); *H04N 19/52* (2014.11); *H04N 19/56* (2014.11); *H04N 19/70* (2014.11); *H04N 19/82* (2014.11)

(56) References Cited

U.S. PATENT DOCUMENTS

| | | |
|---|---|---|
| 2006/0013313 A1 | 1/2006 | Han et al. |
| 2006/0083300 A1 | 4/2006 | Han et al. |
| 2008/0165848 A1 | 7/2008 | Ye et al. |

OTHER PUBLICATIONS

Arad et al. "Enhancement by Image-Dependent Warping", IEEE Transactions on Image Processing, vol. 8, No. 8. Aug. 1999. (Year: 1999).*
Jie Dong, et al., "Description of scalable video coding technology proposal by InterDigital Communications", InterDigital Communications, LLC, Joint Collaborative Team on Video Coding (JCT-VC) of ITU-T SG16 WP3 and ISO/IEC JTC1/WC29/WG11, Oct. 10-19, 2012, 30 pages, JCTVC-K0034.
Jung Won Kang, et al., "Description of scalable video coding technology proposal by ETRI and Kwangwoon Univ.", ETRI & KWU, Joint Collaborative Team on Video Coding (JCT-VC) of ITU-T SG16 WP3 and ISO/IEC JTC1/SC29/WG11, Oct. 10-19, 2012, 20 pages, JCTVC-K0037.
Markus Beermann, "Non-linear up-sampling for spatial scalability", RWTH Aachen University, Joint Video Team (JVT) of ISO/IEC MPEG & ITU-T VCEG (ISO/IEC JTC1/SC29/WG11 and ITU-T SG16 Q.6), Jul. 17-21, 2006, 7 pages, JVT-T020.
Dan Grois, et al., "Complexity-Aware Adaptive Spatial Pre-Processing for ROI Scalable Video Coding with Dynamic Transition Region", 18th IEEE International Conference on Image Processing, 2011, p. 741-744.
Yibin Yang, et al., "Joint Resolution Enhancement and Artifact Reduction for MPEG-2 Encoded Digital Video", ICME 2003, p. 253-256.
Eduardo Asbun, et al., "Preprocessing and Postprocessing Techniques for Encoding Predictive Error Frames in Rate Scalable Video Codecs", 1999, 4 pages.
Nur Arad, et al., "Enhancement by Image-Dependent Warping", IEEE Transactions on Image Processing, vol. 8, No. 8, Aug. 1999, p. 1063-1074.
Woo-Jin Han, et al., "Smoothed reference prediction for single-loop decoding", Joint Video Team (JVT) of ISO/IEC MPEG & ITU-T VCEG (ISO/IEC JTC1/SC29/WG11 and ITU-T SG16 Q.6), Jul. 24-29, 2005, 14 pages, JVT-P085.
"Implementors Guide for H.263: Video coding for low bit rate communication", ITU-T, Aug. 5, 2005, 10 pages.
Thomas Wiegand, et al., "Joint Draft ITU-T Rec. H.264/ISO/IEC 14496-10/Amd.3 Scalable video coding", Jun. 29-Jul. 5, 2007, 563 pages, JVT-X201.
Beermann M: "Non-linear up-sampling for spatial scalability", 20. JVT Meeting; 77. MPEG Meeting; Jul. 15, 2006-Jul. 21, 2006; Klagenfurt, AT; (Joint Video Team of ISO/IEC JTC1/SC29/WG11 and ITU-TSG.16 ), No. JVT-T020, Jul. 15, 2006, XP030006507, ISSN: 0000-0408. (Year: 2006).
Dong J et al: "Description of scalable video coding technology proposal by InterDigital Communications", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); Oct. 1, 2012, XP030112966. (Year: 2012).

\* cited by examiner

METHOD FOR DETERMINING PREDICTOR BLOCKS FOR A SPATIALLY SCALABLE VIDEO CODEC

CROSS-REFERENCE TO RELATED APPLICATION

This application is a continuation of U.S. patent application Ser. No. 14/866,177, filed on Sep. 25, 2015, which is a continuation of International Application No. PCT/RU2013/000258, filed on Mar. 28, 2013. All of the afore-mentioned patent applications are hereby incorporated by reference in their entireties.

BACKGROUND

The present invention relates to a method for determining predictor blocks of a first high resolution layer image from blocks of a second low resolution layer image and to a spatially scalable video codec which is configured to transcode between the different resolution blocks.

Since modern video broadcasting and teleconferencing systems rapidly expand to embrace all kinds of video-enabled appliances ranging from low-cost mobile phones up to high-end HDTV telepresence terminals, the need for resolution-scalable video streaming arises. While high-performance HDTV video terminals are capable of real-time decoding and playback of high resolution video stream, mobile devices are often limited in both, display resolution and computing resources which makes standard definition (SI)) resolution optimal for such devices. One of the widely used solutions for that problem is video transcoding. The dedicated transcoding server decodes the incoming high resolution video streams, rescales them to lower resolution and then encodes the resealed video sequences to produce the video streams for sending to low performance clients. This kind of solution severely suffers from high computational complexity of the transcoding process especially in case of multiple video streams processing, which requires expensive high-performance transcoding servers to be integrated into the broadcasting or teleconferencing system thereby significantly increasing both, system building and maintenance costs. Additional shortcoming of the transcoding solution is the piling up of image quality degradation introduced by the lossy video coding algorithms. The lower resolution video stream is derived from the decoded high resolution stream (rather than the original undistorted video sequence, which is not available on the transcoding server) which has already been distorted due to lossy video coding artefacts, so the second encoding stage adds even more coding distortion.

A more elegant solution comes from the scalable video codecs like H.263+ and H.264/SVC. The encoding to several different resolutions is performed by the video encoder operating on the video streaming source device, so that the video stream which is sent to the video broadcasting or teleconferencing server does already contain all required resolutions embedded as scalable layers and the server only needs to send to each video client the appropriate layer data which is most suitable for the client's performance and capabilities (or broadcast all layers' data so that each client would extract the most suitable layer itself). Since the dispatching of scalable layers is a much less computationally intensive task than the transcoding of multi-channel video streaming the costs of broadcasting/teleconferencing server are reduced dramatically. Additionally, this solution provides a good means of network packet loss protection. If the packets containing higher resolution layer data are lost during network transmission, the receiver still can decode and display the lower resolution image thereby avoiding image freezing or corruption which are the common problems for many video codecs used in error-prone networks. Moreover, due to unequal importance of different layers, the base layer for example is more important than the enhancement layers, efficient unequal FEC techniques may be used to improve packet loss protection while keeping FEC extra data overhead low.

Meanwhile, this solution still suffers from two serious drawbacks. It removes the overwhelming burden of transcoding from the server by distribution of multi-resolution encoding computations among the video source devices which increases the computational and memory resources utilization on those devices. A significant deterioration of coding efficiency is observed due to encoding of several video sequences (representing the same moving picture at various resolutions) to the constrained bit rate budget which might otherwise be more efficiently utilized by the highest resolution video sequence alone.

To mitigate the aforementioned problems, modern scalable video codec standards introduce inter-layer prediction coding mode. Each macro-block of higher resolution layer frame can be predicted using the collocated macro-block of the up-scaled lower resolution layer frame rather than neighbouring macro-blocks of the same frame (as in intra-prediction) or the reference frame of the same layer (as in inter-prediction). Inter-layer prediction helps to alleviate both problems. It does not require a computationally intensive motion estimation procedure for the higher resolution layer since it uses prediction macro-block of the same position in the up-scaled lower resolution frame as the macro-block being encoded. Prediction of the higher resolution image from the lower resolution version of the same image helps to decrease informational redundancy introduced by the encoding of several versions of the same image and thereby improves coding efficiency.

Still, inter-layer prediction fails to defeat the coding efficiency deterioration problem completely. Even when using it the coding efficiency of the multi-layer spatial scalability codec is up to 20% worse than the coding efficiency of the single-layer codec. Hence, improvement of coding efficiency for multi-layer spatial scalability codecs is an important problem for making the scalable codec based broadcasting/teleconferencing system cost-effective.

Modern inter-layer prediction algorithms for spatial scalability video codec should satisfy the following requirements: The algorithm should minimize prediction residual signal in order to provide better coding efficiency improvement. The algorithm should minimize the computational complexity and memory requirements of optimal prediction parameters search (if any). The algorithm should provide means for flexible quality-performance trade-off if computationally intensive optimal prediction parameters search is involved. The algorithm should lead to little increase in decoding complexity. The algorithm should allow easy and seamless integration into the existing scalable video codec architecture and infrastructure.

The older spatial scalability enabled codec H.263+ (Annex O) as described by ITU-T H.261 "Video coding for low bit rate communication" on pp. 102-114 and as depicted in FIG. 10 performs inter-layer prediction only by up-sampling the reconstructed samples of the lower resolution layer signal. The low resolution image 1204 is obtained by downscaling 1201 the high resolution image 1202. The low resolution image 1204 is encoded and reconstructed 1203 for obtaining the SVC base layer image 1206 in low resolution which is up-scaled 1205 to the up-scaled SVC base layer image 1208 in high resolution. The inter-layer spatial prediction 1207 is applied to that up-scaled SVC base layer image 1208 to reconstruct the original SVC spatial layer image 1202 in high resolution.

The current state-of-the-art scalable video codec standard H.264/SVC additionally specifies inter-layer motion prediction mode where the motion parameters of the higher resolution layer (reference indexes, partitioning data, motion vectors) are predicted or derived using the up-scaled motion parameters of the lower resolution layer and inter-layer residual prediction mode where the residual signal of the higher resolution layer is predicted using the up-scaled residual signal of the lower resolution layer as described by T. Wiegand, G. Sullivan, Reichel, H. Schwarz, M. Wien, "Joint Draft ITU-T Rec. H.264|ISO/IEC 14496-10/Amd.3 Scalable video coding", pp. 380-562.

However, those inter-layer prediction modes suffer from the inefficiency of prediction of the higher resolution signal from the up-scaled lower resolution signal for the regions containing distinct edges due to the fact that those edges become smeared after having been downscaled in the lower resolution layer encoder which uses the downscaled original higher resolution image as input data and subsequently up-scaled back in the higher resolution layer encoder which uses the up-scaled reconstructed lower resolution layer data as a predictor. Therefore, the inter-layer prediction generates a high energy residual signal for such regions which deteriorates the coding efficiency either by degrading the quality in order to fit into the constrained hit rate or by increasing the bit rate if the quality is retained.

Some efforts as described in the following have been made to improve the scalable coding. Selective usage of different up-sample filters adaptive to local image properties improves the inter-layer prediction efficiency as described by C. A. Segall and S.-M, "Method and apparatus for adaptive up-scaling for spatially scalable coding", U.S. Pat. No. 7,876,833. This method augments the current six-tap up-scaling filter specified by the H.264/SVC standard with a few computationally simpler filters which can improve prediction for smooth image areas but does not improve edge crispness, and therefore, does not provide any coding efficiency improvement for areas containing distinct edges.

Adaptive smoothing of less important background regions of the image decreases bit budget consumed by such regions, thereby saving bits for more important regions of interest as described by D. Grois and O. Hadar, "Complexity-aware adaptive spatial pre-processing for ROI scalable video coding with dynamic transition region" in 18th IEEE International Conference on Image Processing, 2011. That method removes image details deemed unnecessary or non-important which is not always desirable especially for the case that image crispness should be retained. In addition, this method requires the pre-processing stage to recognize the ROI (region of interest) in the image which usually involves complicated computer vision technologies thereby significantly increasing computational complexity of the entire system.

Smoothing of the prediction signal in inter-layer residual prediction mode compensates for the restrictions imposed by the single-loop decoding approach and achieves better inter-layer prediction for that particular approach as described by W.-J. Han, "Smoothed reference prediction for single-loop decoding" in Joint Video Team 16th Meeting: Poznań, P L, 24-29 Jul. 2005, Document: JVT-P085. This method is only meaningful for the specific case of single-loop decoding approach and is of no practical use in the more general case.

Joint resolution enhancement and artifact reduction for MPEG-2 encoded video is applied to the decoded image for displaying lower resolution image on high-definition monitor as described by Y. Yang and L. Boroczky, "Joint resolution enhancement and artifact reduction for MPEG-2 encoded digital video" in Proceedings of International Conference on Multimedia and Expo, 2003. In this method, sharpness enhancement is applied to the decoded image at the decoder where the original image being predicted is not available. Therefore, such an approach lacks the ability to choose optimal sharpness enhancement parameters in order to achieve the best prediction efficiency and provides no improvement for coding efficiency at the encoder side.

Pre-processing and post-processing techniques including sharpness enhancement are applied to PEF (predictive error frame, i.e. residual frame produced by motion compensation) to improve the PEF coding efficiency in rate-scalable wavelet-based video codecs as described by E. Asbun, P. Salama and E. Delp, "Preprocessing and Postprocessing Techniques for Encoding Predictive Error Frames in Rate Scalable Video Codecs" in Proceedings of the 1999 International Workshop on Very Low Bitrate Video Coding. In this method, the sharpness enhancement is applied to the decoded PET in the decoder rather than the prediction frame in the encoder, so it cannot be used to improve the efficiency of inter-layer prediction.

SUMMARY

It is the object of the invention to provide an improved technique for inter-layer prediction in spatial scalable video codecs.

This object is achieved by the features of the independent claims. Further implementation forms are apparent from the dependent claims, the description and the figures.

The invention is based on the finding that by introducing two additional inter-layer prediction modes into the scalable video codec such an improved technique is provided. The first inter-layer prediction mode is using the up-scaled lower resolution layer image processed by a sharpening filter. The second inter-layer prediction mode is using the up-scaled lower resolution layer image produced using a custom scale factor different from the default one, i.e., the scale factor between the higher and lower resolution layers. The new prediction modes are used for the cases that they provide a lower residual signal energy than other available prediction modes, i.e. such as intra-prediction, inter-prediction, current standard inter-layer prediction. This allows achieving a lower bit rate for the higher resolution layer bitstream while keeping the same quality as for the current scalable video codec standards or, alternatively, a better quality at the same bit rate.

In order to describe the invention in detail, the following terms, abbreviations and notations will be used:
- H.264: Video Codec according to ITU-T H.264 standard.
- H.263+: Video Codec according to ITU-T H.263 standard, Annex O.
- H.264 AVC: Video Codec according to ITU-T H.264 Advanced Video Coding standard.
- H.264 SVC: Video Codec according to ITU-T H.264 Scalable Video Coding standard.
- FEC: Forward Error Correction.
- Video frame: In the field of video compression a video frame is compressed using different algorithms with different advantages and disadvantages, centered mainly around amount of data compression. These different algorithms for video frames are called picture types or frame types. The three major picture types used in the different video algorithms are I, P and B. I-frames are the least compressible but don't require other video frames to decode. P-frames can use data from previous frames to decompress and are more compressible than I-frames. B-frames can use both previous and forward frames for data reference to get the highest amount of data compression.

Macro block: A macro block is an image compression component and technique based on discrete cosine transform that is used on still images and video frames. Macro blocks are usually composed of two or more blocks of pixels. The size of a block depends on the codec and is usually a multiple of 4. In modern codecs such as H.263 and H.264 the overarching macro block size is fixed at 16×16 pixels, but this is broken down into smaller blocks or partitions which are either 4, 8 or 16 pixels by 4, 8 or 16 pixels. Combinations of these smaller partitions must combine to form 16×16 macro blocks.

SD: Standard Definition.

HDTV: High Definition Television.

PEF: Predictive Error Frame.

ROI: Region Of Interest.

SAD: sum of absolute differences.

SATD: sum of absolute transformed differences.

SSD: sum of squared differences.

According to a first aspect, the invention relates to a method for determining predictor blocks of a first resolution layer image from blocks of a second resolution layer image of a spatially scalable video codec, wherein a resolution of the first resolution layer image is higher than a resolution of the second resolution layer image, the method comprising: up-scaling each block of the second resolution layer image to a corresponding block of an up-scaled second resolution layer image; and filtering each block of the up-scaled second resolution layer image by a sharpening filter to obtain a predictor block of the first resolution layer image.

When image blocks containing distinct edges which are smeared by downsampling/upsampling transforms are predicted, the residual signal is reduced, thereby resulting in improved coding efficiency. The method can be easily and seamlessly be integrated into the existing scalable video codec architecture and infrastructure. The new prediction mode augments the inter-layer prediction with sharpening enhancement of up-sampled lower resolution layer image without changing any of the encoder modules or encoder architecture.

In a first possible implementation form of the method according to the first aspect, a scale factor of the up-scaling corresponds to a ratio of the resolutions of the first resolution layer image and the second resolution layer image.

When the scale factor corresponds to the ratio of the resolutions of the first and the second resolution layer images, the first (high) resolution layer image can be reconstructed from the second (low) resolution layer image by a simple up-scaling with the scale factor.

In a second possible implementation form of the method according to the first aspect as such or according to the first implementation form of the first aspect, the sharpening filter comprises a parametric sharpening filter.

The parametric sharpening filter allows to optimally adjust the parameters of the sharpening filter, thereby improving accuracy of the filtering and thus accuracy of the reconstruction of the first (high) resolution layer image from the second (low) resolution layer image.

In a third possible implementation form of the method according to the first aspect as such or according to any of the preceding implementation forms of the first aspect, the sharpening filter comprises one of the following filters: a Gaussian smoothing based filter, a Laplacian based filter, an adaptive direction sensitive sharpening filter, a warp sharpening filter.

When using such simple sharpening filters, the decoding complexity is not significantly increased.

In a fourth possible implementation form of the method according to the first aspect as such or according to any of the preceding implementation forms of the first aspect, the method comprises: determining parameters of the sharpening filter according to an optimization criterion minimizing block prediction errors.

A parametric filter with parameters searched by an optimal parameter search allows a flexible implementation with regard to quality-performance trade-off.

In a fifth possible implementation form of the method according to the first aspect as such or according to any of the preceding implementation forms of the first aspect, the method comprises: determining parameters of the sharpening filter with respect to minimizing a block prediction cost function; and adding the parameters of the sharpening filter to a bitstream of the video codec.

Adding the parameters of the sharpening filter to the bitstream of the video codec allows using the same sharpening filter for the encoding and the decoding of the image. Thus the encoding and decoding is synchronized.

In a sixth possible implementation form of the method according to the fifth implementation form of the first aspect, the cost function is based on a distortion created during an encoding process of the video codec and a bit rate of the bitstream of the video codec.

Such a cost function is easy to implement having low computational complexity for searching the optimal parameters.

In a seventh possible implementation form of the method according to the first aspect as such or according to any of the preceding implementation forms of the first aspect, the first resolution layer image comprises a spatial enhancement layer of a H.264/SVC video codec and the second resolution layer image comprises a spatial base layer of the H.264/SVC video codec.

Thus, the software of the H.264/SVC video codec can be reused for implementing the method according to the seventh implementation form. Small adaptations of the existing software are easy to realize.

According to a second aspect, the invention relates to a method for determining predictor blocks of a first resolution layer image from blocks of a second resolution layer image of a spatially scalable video codec, wherein a resolution of the first resolution layer image is higher than a resolution of the second resolution layer image, the method comprising: up-scaling each block of the second resolution layer image to a corresponding block of an up-scaled second resolution layer image by using a scale factor different from a ratio of the resolutions of the first resolution layer image and the second resolution layer image; and selecting a block of the up-scaled second resolution layer image as predictor block of the first resolution layer image.

When image blocks containing distinct edges which are smeared by downsampling/upsampling transforms are predicted, the residual signal is reduced, thereby resulting in improved coding efficiency. The method can be easily and seamlessly be integrated into the existing scalable video codec architecture and infrastructure. The new prediction mode re-uses existing image up-sampling module with custom scale factor.

In a first possible implementation form of the method according to the second aspect, the block of the up-scaled second resolution layer image is selected among blocks of the up-scaled second resolution layer image surrounding the corresponding block of the up-scaled second resolution layer image.

The selection process will result in the optimal block with respect to sharpness of the image.

In a second possible implementation form of the method according to the second aspect as such or according to the first implementation form of the second aspect, the method comprises: determining the scale factor and a displacement vector representing a displacement of the selected block of the up-scaled second resolution layer image with respect to the corresponding block of the up-scaled second resolution layer image for minimizing a block prediction cost function; and adding the scale factor and the displacement vector to a bitstream of the video codec.

Adding the scale factor and the displacement vector to the bitstream of the video codec allows using the upscaling and selection procedure for the encoding and the decoding of the image. Thus the encoding and decoding is synchronized.

In a third possible implementation form of the method according to the second aspect as such or according to any of the preceding implementation forms of the second aspect, the first resolution layer image comprises a spatial enhancement layer of a H.264/SVC video codec and the second resolution layer image comprises a spatial base layer of the H.264/SVC video codec.

Thus, the software of the H.264/SVC video codec can be reused for implementing the method according to the third implementation form. Small adaptations of the existing software are easy to realize.

According to a third aspect, the invention relates to a spatially scalable video codec configured to transcode between blocks of a first resolution layer image and blocks of a second resolution layer image, wherein a resolution of the first resolution layer image is higher than a resolution of the second resolution layer image, the video codec comprising: an up-scaling unit configured to up-scale each block of the second resolution layer image to a corresponding block of an up-scaled second resolution layer image; and a sharpening filter configured to filter each block of the up-scaled second resolution layer image to obtain a predictor block of the first resolution layer image.

The spatially scalable video codec can be easily and seamlessly be integrated into the existing scalable video codec architecture and infrastructure. The new prediction mode augments the inter-layer prediction with sharpening enhancement of up-sampled lower resolution layer image without changing any of the encoder modules or encoder architecture.

According to a fourth aspect, the invention relates to a spatially scalable video codec configured to transcode between blocks of a first resolution layer image and blocks of a second resolution layer image, wherein a resolution of the first resolution layer image is higher than a resolution of the second resolution layer image, the video codec comprising: an up-scaling unit configured to up-scale each block of the second resolution layer image to responding block of an up-scaled second resolution layer image by using a scale factor different from a ratio of the resolutions of the first resolution layer image and the second resolution layer image; and a selection unit configured to select a block of the up-scaled second resolution layer image as a predictor block of the first resolution layer image.

The spatially scalable video codec can be easily and seamlessly be integrated into the existing scalable video codec architecture and infrastructure. The new prediction mode re-uses existing image up-sampling module with custom scale factor.

According to a fourth aspect, the invention relates to a spatially scalable video codec configured to transcode between blocks of a first resolution layer image and blocks of a second resolution layer image, wherein a resolution of the first resolution layer image is higher than a resolution of the second resolution layer image, the video codec comprising: an up-scaling unit configured for up-scaling each block of the second resolution layer image to a corresponding block of an up-scaled second resolution layer image representing a first predictor block of the first resolution layer image, wherein the up-scaling uses a scale factor corresponding to a ratio of the resolutions of the first resolution layer image and the second resolution layer image; a sharpening filter configured to filter each corresponding block of the up-scaled second resolution layer image representing the first predictor block of the first resolution layer image to obtain a second predictor block of the first resolution layer image; and a selection unit configured to select a predictor block for predicting the first resolution layer image from the first, the second and the third predictor block.

The spatially scalable video codec can be easily and seamlessly be integrated into the existing scalable video codec architecture and infrastructure. The new first prediction mode augments the inter-layer prediction with sharpening enhancement of up-sampled lower resolution layer image and the new second prediction mode re-uses existing image up-sampling module with custom scale factor. No changes in the encoder modules or encoder architecture are necessary.

According to a fifth aspect, the invention relates to an inter-layer spatial prediction method for spatially scalable video codecs, where the up-scaled reconstructed lower resolution layer image is processed by parametric sharpening enhancement prior to being used for prediction of higher resolution layer image.

In a first possible implementation form of the fifth aspect, the enhancements are one of the following: Gaussian smoothing-based, Laplacian-based, adaptive direction-sensitive sharpening and warp sharpening.

In a second possible implementation form of the fifth aspect, the configurable sharpening enhancement parameters are varied in the encoder to achieve the best prediction and the resulting parameter values are written to the bit stream.

In a third possible implementation form of the fifth aspect, the configurable sharpening enhancement parameters are one of the following: "depth" and "blur passes" for warp sharpening.

According to a sixth aspect, the invention relates to an inter-layer spatial prediction method for spatially scalable video codecs, where the reconstructed lower resolution layer image is upscaled using custom scale factor different from the default one determined by the ratio of resolutions of spatial layers to form the image within which a predictor block for the higher resolution layer image block is searched in the neighborhood of the block corresponding to the block being predicted.

In a first possible implementation form of the sixth aspect, the custom scale factor of the up-scaling and the displacement vector of the predictor block in the up-scaled image are varied in the encoder to achieve the best prediction and the resulting values are written to the bit stream.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

DETAILED DESCRIPTION

Figure 1A:
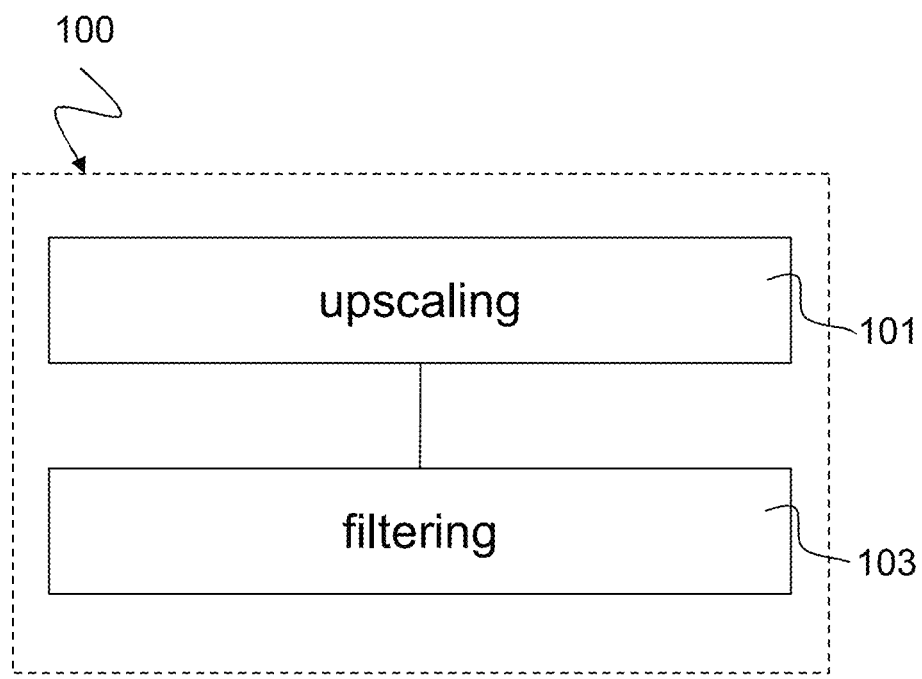
FIG. 1a shows a schematic diagram of a method for determining predictor blocks of a first resolution layer image from blocks of a second resolution layer image of a spatially scalable video codec according to an implementation form.

FIG. 1a shows a schematic diagram of a method 100 for determining predictor blocks of a first resolution layer image from blocks of a second resolution layer image of a spatially scalable video codec according to an implementation form. The first resolution layer image is a higher resolution image and the second resolution layer image is a lower resolution layer image, i.e., the resolution of the first resolution layer image is higher than the resolution of the second resolution layer image. The method 100 comprises up-scaling 101 each block of the second resolution layer image to a corresponding block of an up-scaled second resolution layer image. The method 100 comprises filtering 103 each block of the up-scaled second resolution layer image by a sharpening filter to obtain a predictor block of the first resolution layer image.

In an implementation form, a scale factor of the up-scaling 101 corresponds to a ratio of the resolutions of the first resolution layer image and the second resolution layer image. In an implementation form, the sharpening filter comprises a parametric sharpening filter. In an implementation form, the sharpening filter comprises one of the following filters: a Gaussian smoothing based filter, a Laplacian based filter, an adaptive direction sensitive sharpening filter, a warp sharpening filter. In an implementation form, the method 100 comprises determining parameters of the sharpening filter according to an optimization criterion minimizing block prediction errors. In an implementation form, the method 100 comprises: determining parameters of the sharpening filter with respect to minimizing a block prediction cost function; and adding the parameters of the sharpening filter to a bitstream of the video codec. In an implementation form, the cost function is based on a distortion (D) created during an encoding process of the video codec and a bit rate (R) of the bitstream of the video codec. In an implementation form, the first resolution layer image comprises a spatial enhancement layer of a H.264/SVC video codec and the second resolution layer image comprises a spatial base layer of the H.264/SVC video codec.

Figure 1B:
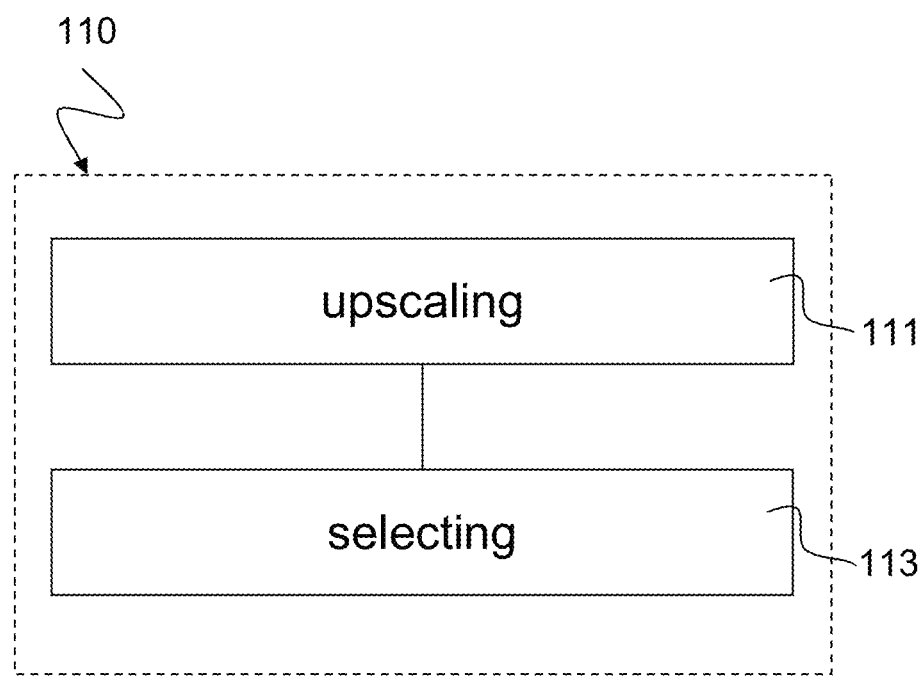
FIG. 1b shows a schematic diagram of a method for determining predictor blocks of a first resolution layer image from blocks of a second resolution layer image of a spatially scalable video codec according to an implementation form.

FIG. 1b shows a schematic diagram of a method 110 for determining predictor blocks of a first resolution layer image from blocks of a second resolution layer image of a spatially scalable video codec according to an implementation form. The first resolution layer image is a higher resolution image and the second resolution layer image is a lower resolution layer image, i.e., the resolution of the first resolution layer image is higher than the resolution of the second resolution layer image. The method 110 comprises up-scaling 111 each block of the second resolution layer image to a corresponding block of an up-scaled second resolution layer image by using a scale factor different from a ratio of the resolutions of the first resolution layer image and the second resolution layer image. The method 110 comprises selecting 113 a block of the up-scaled second resolution layer image as predictor block of the first resolution layer image.

In an implementation form, the block of the up-scaled second resolution layer image is selected among blocks of the up-scaled second resolution layer image surrounding the corresponding block of the up-scaled second resolution layer image. In an implementation form, the method 110 comprises determining the scale factor and a displacement vector representing a displacement of the selected block of the up-scaled second resolution layer image with respect to the corresponding block of the up-scaled second resolution layer image for minimizing a block prediction cost function; and adding the scale factor and the displacement vector to a bitstream of the video codec. In an implementation form, the first resolution layer image comprises a spatial enhancement layer of a H.264/SVC video codec and the second resolution layer image comprises a spatial base layer of the H.264/SVC video codec.

Figure 2:
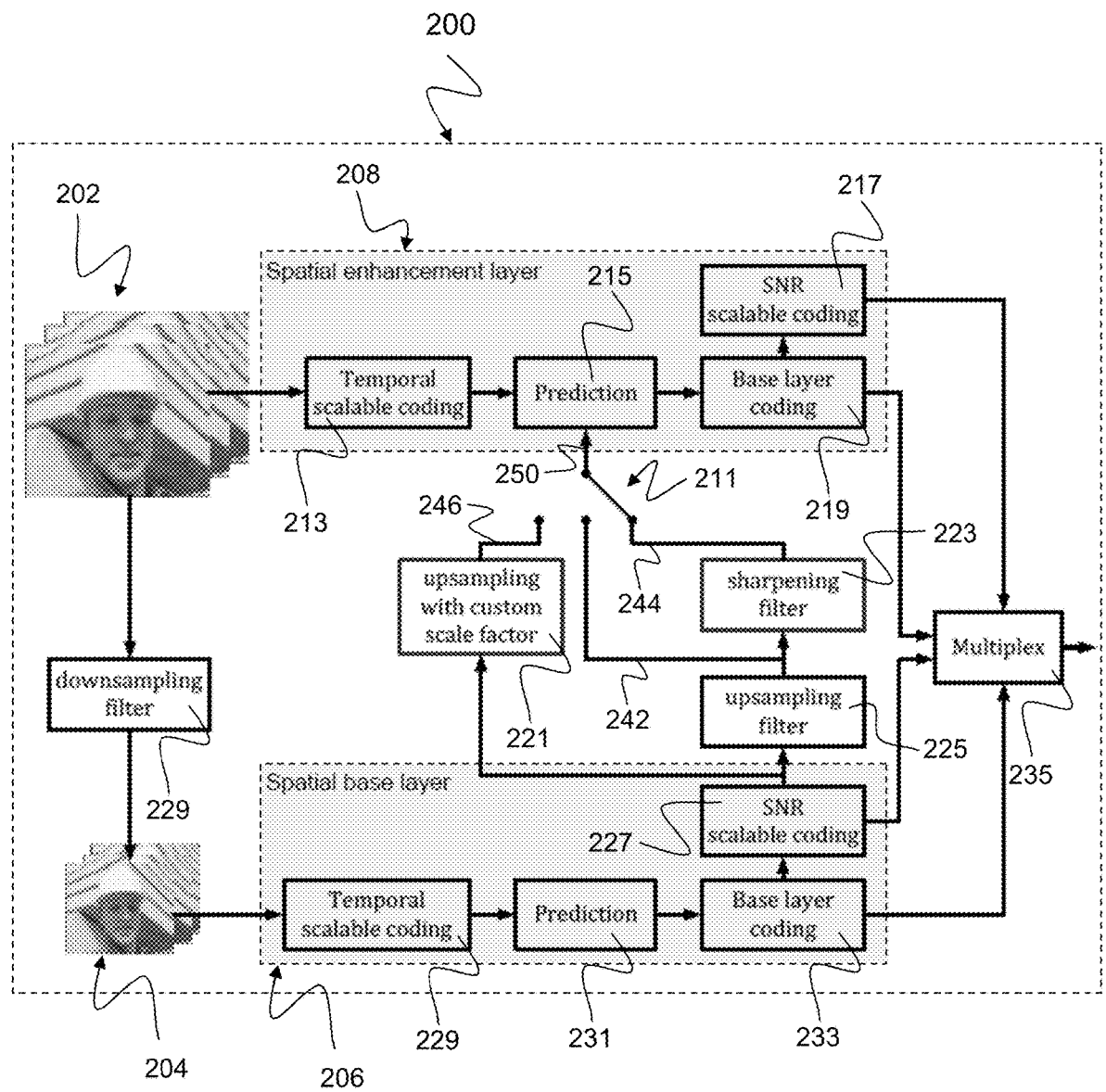
FIG. 2 shows a flow chart of a scalable video encoder according to an implementation form.

FIG. 2 shows a flow chart of a scalable video encoder 200 according to an implementation form. The scalable video encoder 200 comprises two new inter-layer prediction modes for spatially scalable video codecs. FIG. 2 shows the scalable video encoder flow chart and the placement of the new inter-layer prediction modes within the scalable codec architecture (blocks 221 and 223).

The scalable video encoder 200 comprises a spatial enhancement layer 208 and a spatial base layer 206. The two new inter-layer prediction modes are arranged between those layers 208, 206. The spatial enhancement layer 208 comprises a temporal scalable coding unit 213, a prediction unit 215, a base layer coding unit 219 and a SNR scalable coding unit 217. The temporal scalable coding unit 213 is configured for receiving a first resolution layer image 202 of a high resolution and to provide a temporal scaled coded version of that image to the prediction unit 215. The prediction unit 215 provides a prediction signal based on the temporal scaled coded version of the first resolution layer image 202 and an upscale signal 250 provided by a switch 211 to the base layer coding unit 219. After base layer coding and SNR scalable coding, the output signals of base layer coding unit 219 and SNR scalable coding unit 217 are provided to the multiplex 235 for output. The spatial base layer 206 comprises a temporal scalable coding unit 229, a prediction unit 231, a base layer coding unit 233 and a SNR scalable coding unit 227. The temporal scalable coding unit 229 is configured for receiving a second resolution layer image 204 of a low resolution and to provide a temporal scaled coded version of that image to the prediction unit 231. The prediction unit 231 provides a prediction signal based on the temporal scaled coded version of the second resolution layer image 204 to the base layer coding unit 233. After base layer coding and SNR scalable coding, the output signals of base layer coding unit 233 and SNR scalable coding unit 227 are provided to the multiplex 235 for output.

The second resolution layer image 204 is derived from the first resolution layer image 202 by down-sampling in a down-sampling filter 229.

An output signal of the SNR scalable coding unit 227 of the spatial base layer 206 is provided to an up-sampling filter 225 providing a first scaled mode signal 242, to the up-sampling filter 225 and a sharpening filter 223 providing a second scaled mode signal 244 and to an upsampling with custom scale factor unit 221 providing a third scaled mode signal 246. The three scaled mode signals 242, 244, 246 are switched by a switch 211 to provide the upscale signal 250 to the prediction unit 215 of the spatial enhancement layer 208. The first scaled mode signal 242 represents the current prediction mode applied in conventional video codecs such as H.263+ Annex O or H.264 SVC. The second scaled mode signal 244 and the third scaled mode signal 246 represent the two new modes of prediction according to aspects of the invention. The processing of the second scaled mode signal 244 may be performed by using the method 100 as described in FIG. 1a. The processing of the third scaled mode signal 246 may be performed by using the method 110 as described in FIG. 1b.

Figure 3:
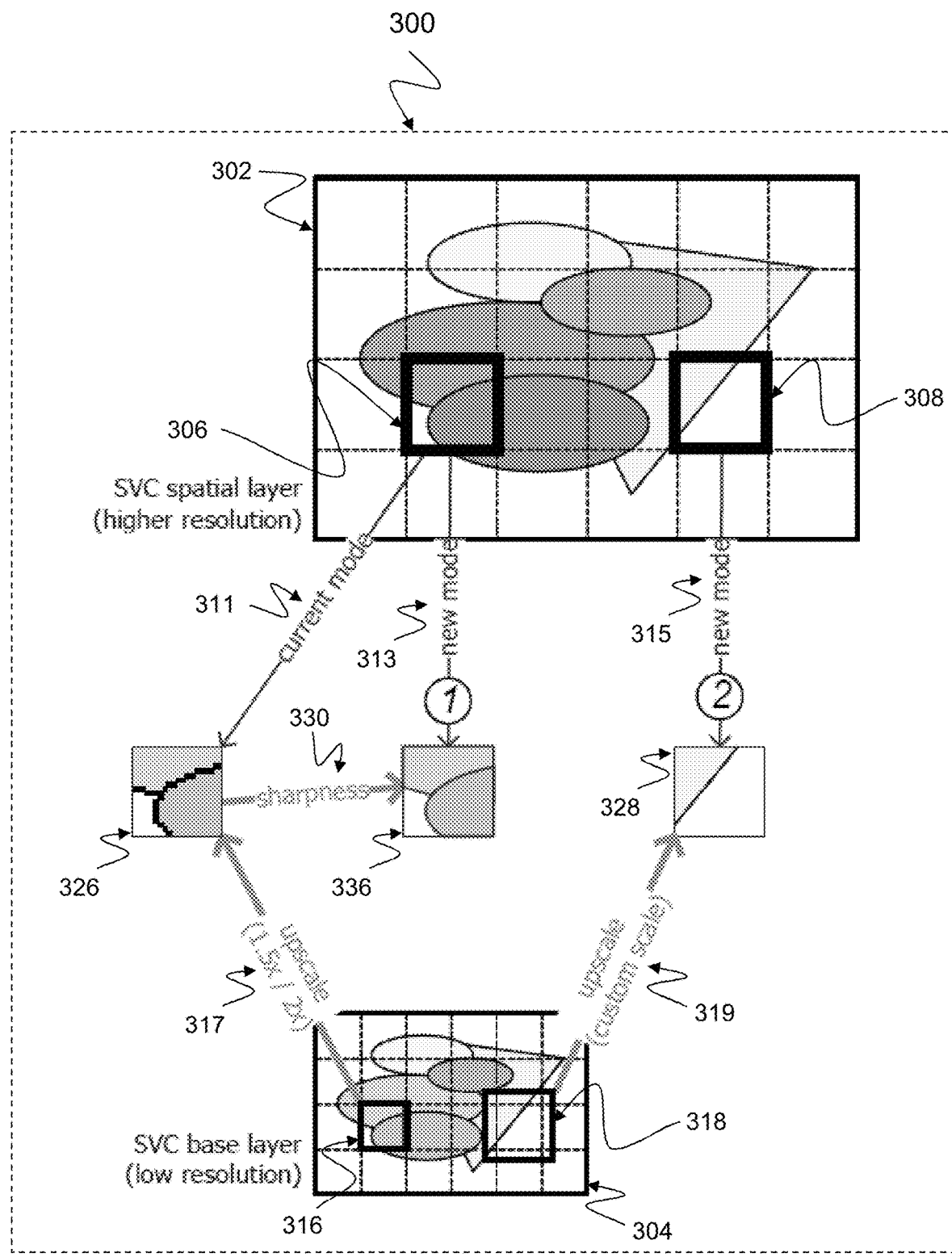
FIG. 3 shows a schematic diagram of inter-layer prediction modes according to an implementation form.

FIG. 3 shows a schematic diagram 300 of inter-layer prediction modes according to an implementation form. A second resolution layer image 304 of a low resolution is up-scaled to a first resolution layer image 302 of a high resolution. Three different modes are depicted for applying the prediction of the first resolution layer image 302 from the second resolution layer image 304. A first mode (current mode) 311 corresponds to the processing of the first scaled mode signal 242 as described above with respect to FIG. 2 that represents the current prediction mode applied in conventional video codecs such as H.263+ Annex O or H.264 SVC. A second mode (new mode 1) 313 corresponds to the processing of the second scaled mode signal 244 as described above with respect to FIG. 2 that represents the first new prediction mode according to the first aspect of the invention which may be performed by using the method 100 as described above with respect to FIG. 1a. A third mode (new mode 2) 315 corresponds to the processing of the third scaled mode signal 246 as described above with respect to FIG. 2 that represents the second new prediction mode according to the second aspect of the invention which may be performed by using the method 110 as described above with respect to FIG. 1b.

The current mode is processed by up-scaling 317 a block 316 of the second resolution layer image 304 to obtain a predictor block 326 which is a corresponding block 306 of the first resolution layer image 302. As can be seen from FIG. 3, the predictor block 326 has blurred edges.

The first new prediction mode is processed by up-scaling 317 a block 316 of the second resolution layer image 304 to a corresponding block 326 of an up-scaled second resolution layer image and filtering 330 the corresponding block 326 of the up-scaled second resolution layer image by a sharpening filter to obtain a predictor block 336 which is a corresponding block 306 of the first resolution layer image 302. As can be seen from FIG. 3, the predictor block 336 has sharp edges. The sharpening filter may correspond to one of the filters described below with respect to FIGS. 4 to 6.

The second new prediction mode is processed by up-scaling 319 a scaled block 318 which is scaled by a custom scale to obtain a predictor block 328 which is a corresponding block 308 of the first resolution layer image 302. As can be seen from FIG. 3, the predictor block 328 has sharp edges due to the scaling effects.

The first new mode 313 uses the up-sampled reconstructed frame of the lower resolution layer encoder. For each block of the higher resolution layer image 302 it produces the candidate predictor block 336 by applying a parametric sharpening filter to the collocated block 326 in the up-sampled lower resolution layer image 304 (see FIG. 3, new mode 1). The sharpening filter parameters (if any) are variable mode-specific parameters chosen so as to minimize a block prediction cost function. One example of such a cost function is Cost=D+λR, where D is the distortion created during the encoding process, R is the bit rate required for sending the residual data and specifying the sharpening filter parameter(s) and λ is some constant. Other useful cost criteria comprise SAD (sum of absolute differences), SATD (sum of absolute transformed differences) or SSD (sum of squared differences).

The second new mode uses the up-sampled reconstructed frame 328 of the lower resolution layer encoder produced using the scale factor different from the default one which is determined by the ratio of resolutions of spatial layers. The candidate predictor block 328 is chosen among the blocks of appropriate size (not shown in FIG. 3) in the surrounding area of the block in the up-sampled image corresponding to the block being encoded in the higher resolution layer image 308 (see FIG. 3, new mode 2). The custom scale factor for the up-sampling 319 and the displacement vector of the candidate predictor block in the up-sampled image (relative to the up-sampled image block corresponding to the block being predicted) are variable mode-specific parameters chosen so as to minimize a block prediction cost function. One example of such a cost function is Cost=D+λR as described above. Other useful cost criteria comprise SAD (sum of absolute differences), SATD (sum of absolute transformed differences) SSD (sum of squared differences).

For both new prediction modes, the final encoding mode for the block is chosen among all available encoding modes based on the costs of those modes. Performance optimizations for lowest cost mode search can be realized, e.g. by using heuristic search, decimated parameter set search, etc. In an implementation form, search algorithms which are flexible with regard to quality-performance trade-off are used. In an implementation form of such a search algorithm, the set of parameter values available for the search is varied. A larger set provides better quality at the cost of worse performance and vice versa.

In an implementation form, the size of the image blocks, the new prediction modes are applied to 4×4, 8×8 or 16×16 depending on the subdivision of the macro-block into smaller blocks. The particular subdivision is chosen based on the subdivision cost, i.e. the total cost of all constituent blocks, similarly to intra- and inter-prediction macro-block subdivision used in H.264/AVC codec.

Figure 4:
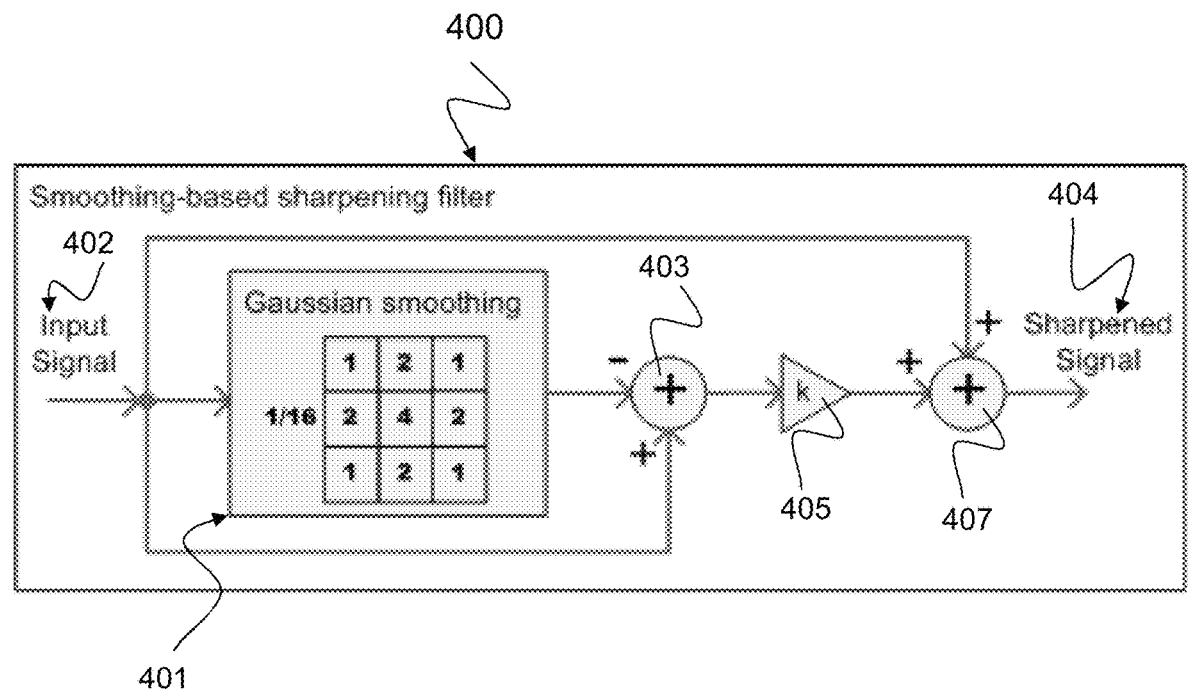
FIG. 4 shows a block diagram of a smoothing based sharpening filter according to an implementation form.

FIG. 4 shows a block diagram of a smoothing based sharpening filter 400 according to an implementation form. The filter 400 comprises a Gaussian smoothing unit 401, a first adder 403, an amplifier 405 and a second adder 407. The input signal 402 passes the Gaussian smoothing unit 401 which is smoothing the input signal 402 obtaining a smoothed input signal which is added to the input signal 402 at the first adder 403. The output of the first adder 403 is amplified by a factor k in the amplifier 405 and provided to the second adder 407 where the output of the amplifier 405 is added to the input signal 402 to obtain the sharpened signal 404 as output of the filter 400.

Figure 5:
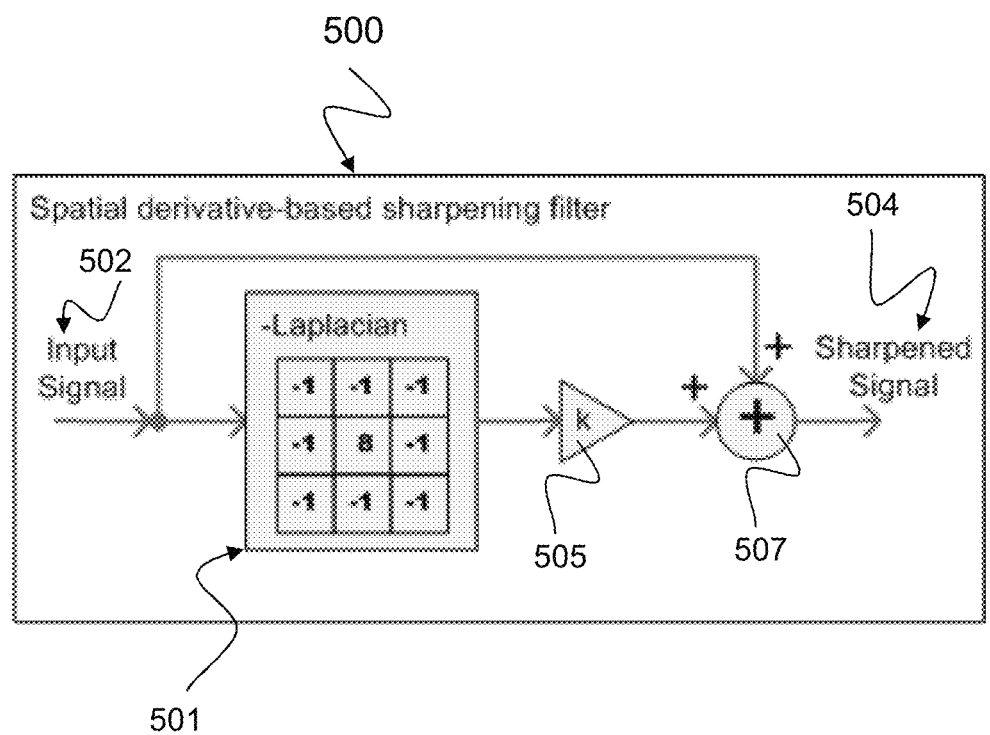
FIG. 5 shows a block diagram of a spatial derivative based sharpening filter according to an implementation form.

FIG. 5 shows a block diagram of a spatial derivative based sharpening filter 500 according to an implementation form. The filter 500 comprises a Laplacian unit 501, an amplifier 505 and an adder 507. The input signal 502 passes the Laplacian unit 401 which is filtering the input signal 402 according to a Laplacian distribution obtaining a Laplacian filtered input signal which is amplified by a factor k in the amplifier 505 and provided to the adder 507 where the output of the amplifier 505 is added to the input signal 502 to obtain the sharpened signal 504 as output of the filter 500.

Figure 6:
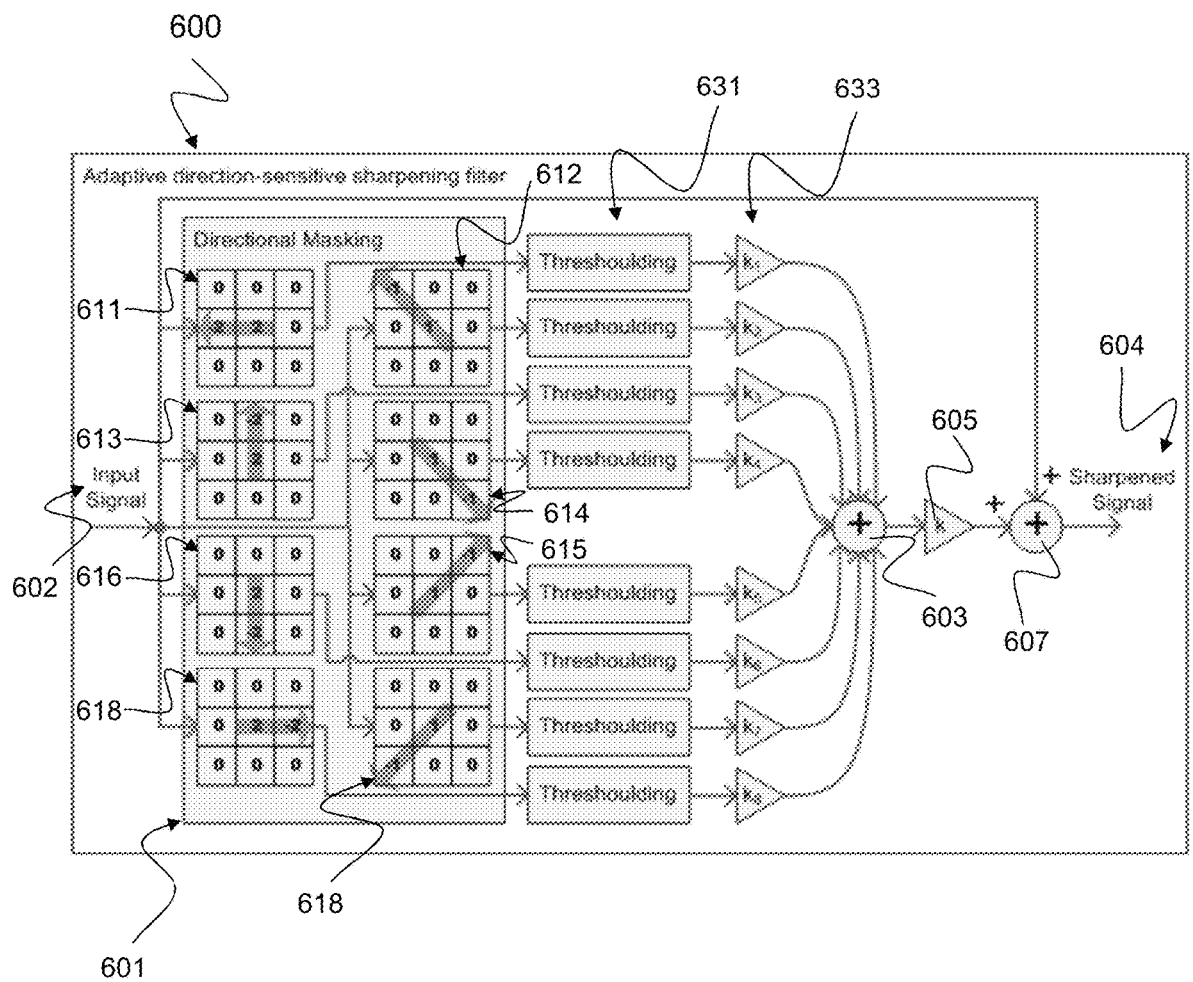
FIG. 6 shows a block diagram of an adaptive direction sensitive sharpening filter according to an implementation form.

FIG. 6 shows a block diagram of an adaptive direction sensitive sharpening filter 600 according to an implementation form. The filter 600 comprises a plurality of directional masking units 611, 612, 613, 614, 615, 616, 617, 618, e.g. a number of eight, the same number of threshold units 631, the same number of amplifiers 633, a first adder 603, a further amplifier 605 and a second adder 607. The input signal 602 passes each of the masking units 611, 612, 613, 614, 615, 616, 617, 618, the threshold units 631 and the amplifiers 633 where eight directional masked amplified versions of the input signal are generated which are added by the first adder 603. The output of the first adder 603 amplified by the further amplifier 605 is added to the input signal 602 in the second adder 607 to obtain the sharpened signal 604 as output of the filter 600.

The adaptive direction sensitive sharpening filter 600 may correspond to the "warp sharpening" as described by N. Arad and C. Gotsman, "Enhancement by Image-Dependent Warping" in IEEE Transactions on Image Processing, Vol. 8, No. 8, August 1999. Such an adaptive direction sensitive sharpening filter 600 provides much better edge enhancement with a minimum of undesired image distortions but at the cost of higher computational complexity.

While the filters based on Gaussian smoothing as described above with respect to FIG. 4 and Laplacian as described with respect to FIG. 5 are computationally simple, the adaptive direction-sensitive sharpening filter as described with respect to FIG. 6 offers a better quality due to adaptivity and processing of diagonal directions at the cost of computational complexity. The scaling coefficient k and the threshold used in the filters in FIGS. 4, 5 and 6 are the mode-specific parameters which can be varied for minimizing the prediction residual signal.

Figure 7:
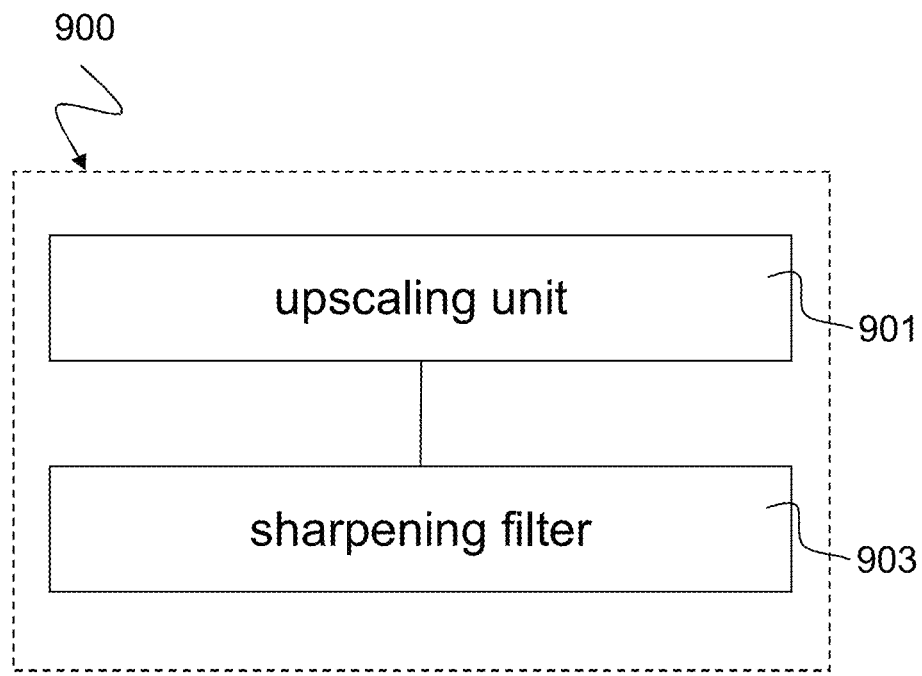
FIG. 7 shows a block diagram of a spatially scalable video encoder according to an implementation form.

FIG. 7 shows a block diagram of a spatially scalable video encoder 900 according to an implementation form. The spatially scalable video codec 900 is configured to transcode between blocks of a first resolution layer image and blocks of a second resolution layer image. The first resolution layer image is a higher resolution image and the second resolution layer image is a lower resolution layer image, i.e., the resolution of the first resolution layer image is higher than the resolution of the second resolution layer image. The video codec 900 comprises an up-scaling unit 901 configured to up-scale each block of the second resolution layer image to a corresponding block of an up-scaled second resolution layer image. The video codec 900 comprises a sharpening filter 903 configured to filter each block of the up-scaled second resolution layer image to obtain a predictor block of the first resolution layer image.

The up-scaling of the up-scaling unit 901 may correspond to the up-scaling as described above with respect to FIGS. 1a to 3 and 7. The sharpening filter may correspond to one of the sharpening filters described with respect to FIGS. 4 to 6.

Figure 8:
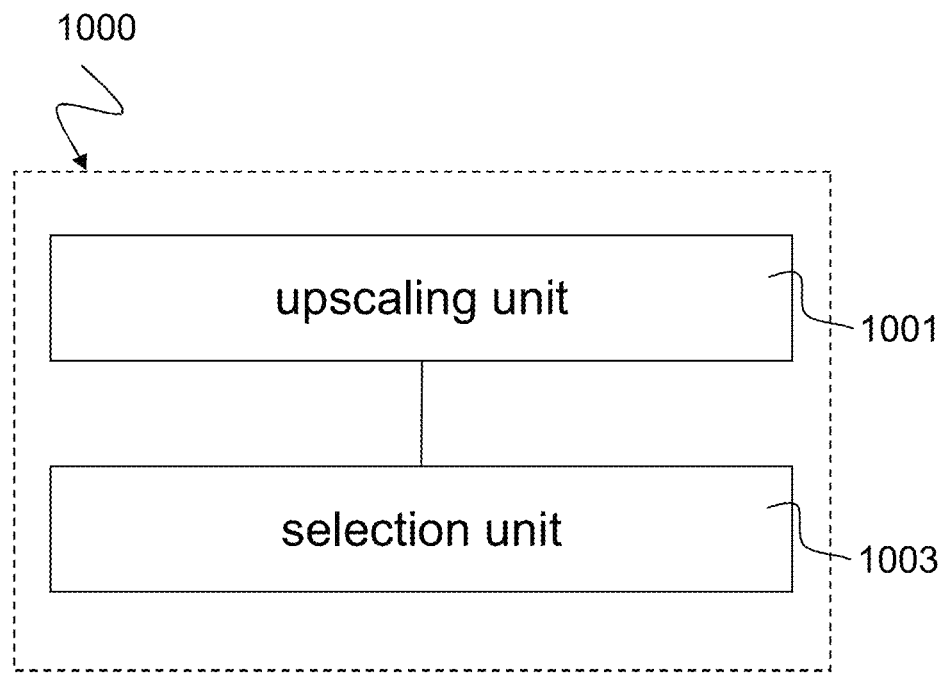
FIG. 8 shows a block diagram of a spatially scalable video encoder according to an implementation form.

FIG. 8 shows a block diagram of a spatially scalable video encoder according to an implementation form. The spatially scalable video codec 1000 is configured to transcode between blocks of a first resolution layer image and blocks of a second resolution layer image. The first resolution layer image is a higher resolution image and the second resolution layer image is a lower resolution layer image, i.e., the resolution of the first resolution layer image is higher than the resolution of the second resolution layer image. The video codec 1000 comprises an up-scaling unit 1001 configured to up-scale each block of the second resolution layer image to a corresponding block of an up-scaled second resolution layer image by using a scale factor different from a ratio of the resolutions of the first resolution layer image and the second resolution layer image. The video codec 1000 comprises a selection unit 1003 configured to select a block of the up-scaled second resolution layer image as a predictor block of the first resolution layer image.

The up-scaling of the up-scaling unit 1001 may correspond to the up-scaling as described above with respect to FIGS. 1a to 3 and 7. The selecting of the selection unit 1003 may correspond to the selecting as described with respect to FIGS. 1a to 3 and 7.

Figure 9:
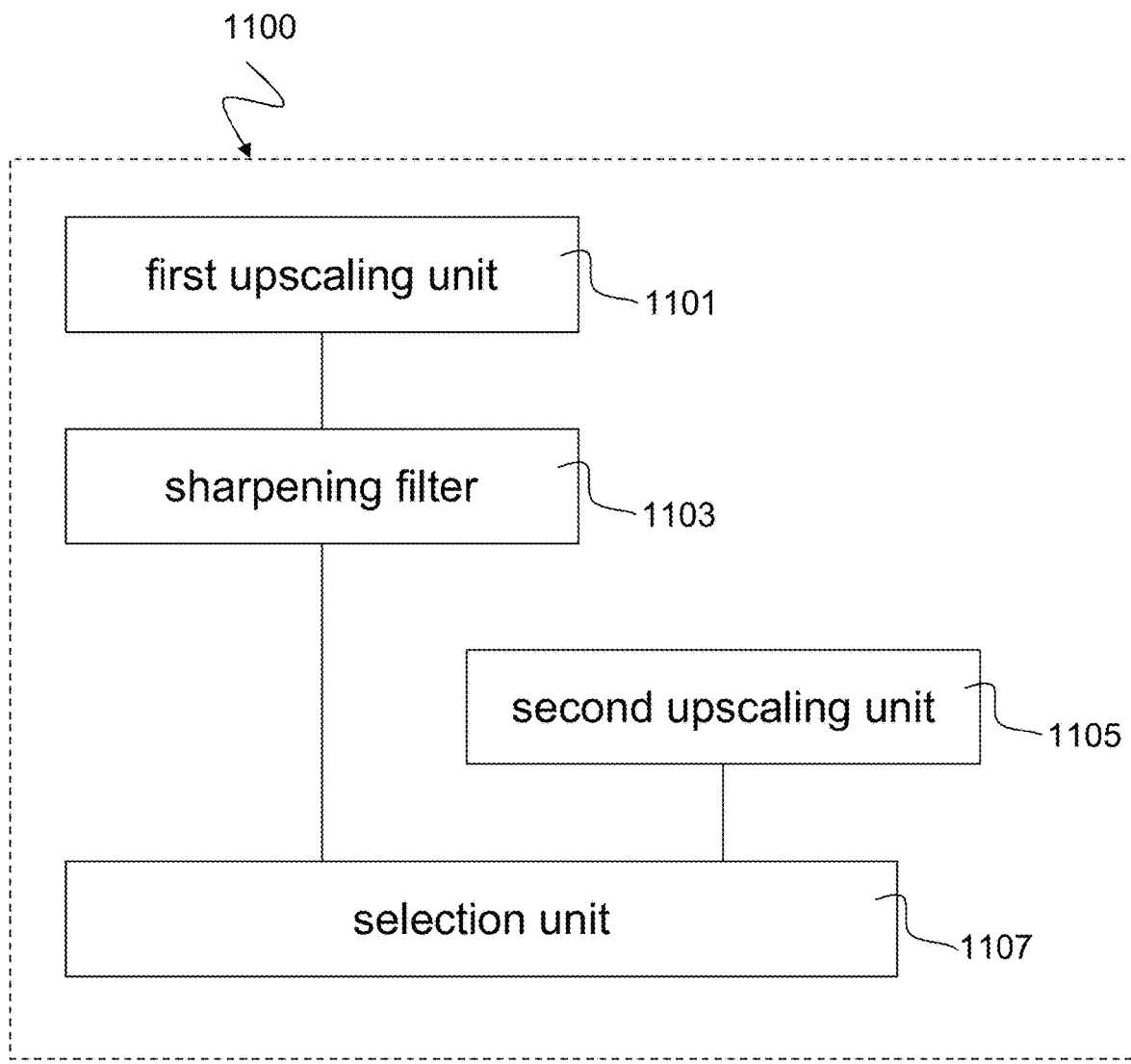
FIG. 9 shows a block diagram of a spatially scalable video encoder according to an implementation form.
Figure 10:
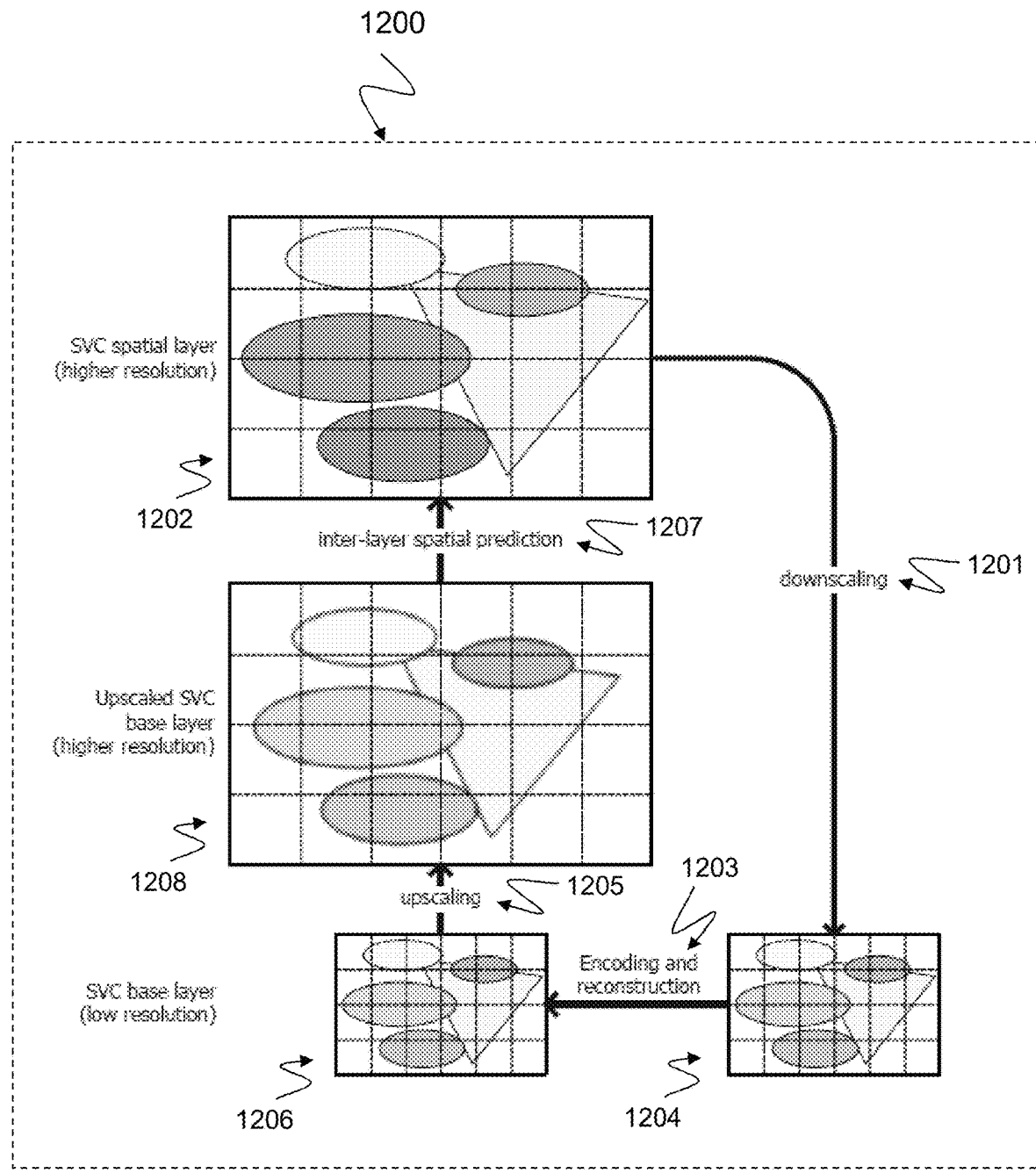
FIG. 10 shows a schematic diagram of inter-layer prediction performed in a conventional video codec.

FIG. 9 shows a block diagram of a spatially scalable video encoder according to an implementation form. The spatially scalable video codec 1100 is configured to transcode between blocks of a first resolution layer image and blocks of a second resolution layer image. The first resolution layer image is a higher resolution image and the second resolution layer image is a lower resolution layer image, i.e., the resolution of the first resolution layer image is higher than the resolution of the second resolution layer image. The video codec 1100 comprises a first up-scaling unit 1101 configured for up-scaling each block of the second resolution layer image to a corresponding block of an up-scaled second resolution layer image representing a first predictor block of the first resolution layer image, wherein the up-scaling uses a first scale factor corresponding to a ratio of the resolutions of the first resolution layer image and the second resolution layer image. The video codec 1100 comprises a sharpening filter 1103 configured to filter each corresponding block of the up-scaled second resolution layer image representing the first predictor block of the first resolution layer image to obtain a second predictor block of the first resolution layer image. The video codec 1100 comprises a second up-scaling unit 1105 configured for up-scaling each block of the second resolution layer image to a corresponding block of an up-scaled second resolution layer image representing a third predictor block of the first resolution layer image, wherein the up-scaling uses a second scale factor different from the first scale factor. The video codec 1100 comprises a selection unit 1107 configured to select a predictor block for predicting the first resolution layer image from the first, the second and the third predictor block.

The up-scaling of the first and second up-scaling units 1101, 1105 may correspond to the up-scaling as described above with respect to FIGS. 1*a* to 3 and 7. The sharpening filter may correspond to one of the sharpening filters described with respect to FIGS. 4 to 6.

The selecting of the selection unit 1107 may correspond to the selecting as described with respect to FIGS. 1*a* to 3 and 7.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A method for determining predictor blocks of a first resolution layer image from blocks of a second resolution layer image in video encoding or decoding, wherein the method is performed by a spatially scalable video encoder or decoder, wherein a resolution of the first resolution layer image is higher than a resolution of the second resolution layer image, and wherein the method comprises:
   up-scaling each block of the second resolution layer image to a corresponding block of an up-scaled second resolution layer image using a scale factor that is different from a ratio of the resolutions of the first resolution layer image and the second resolution layer image;
   filtering a block of the up-scaled second resolution layer image by a warp sharpening filter to obtain a filtered block of the up-scaled second resolution layer image; and
   selecting a predictor block of the first resolution layer image from the filtered block with filtering by the warp sharpening filter and the block without filtering by the warp sharpening filter in the up-scaled second resolution layer image.

2. The method of claim 1, wherein up-scaling each block of the second resolution layer image to the corresponding block of the up-scaled second resolution layer image comprises up-scaling each block of the second resolution layer image to a corresponding block of an up-scaled second resolution layer image representing a first predictor block, and wherein a scale factor of the up-scaling corresponds to a ratio of the resolutions of the first resolution layer image and the second resolution layer image.

3. The method of claim 2, wherein filtering the block of the up-scaled second resolution layer image by the warp sharpening filter to obtain the filtered block of the up-scaled second resolution layer image, comprises:
   filtering a block of the up-scaled second resolution layer image representing the first predictor block to obtain a filtered block of the up-scaled second resolution layer image representing a second predictor block; and
   selecting the predictor block of the first resolution layer image from the filtered block with filtering by the warp sharpening filter and the block without filtering by the warp sharpening filter in the up-scaled second resolution layer image, comprising selecting a predictor block of the first resolution layer image from at least two of the first predictor block, the second predictor block and the third predictor block.

4. The method of claim 1, wherein the warp sharpening filter comprises a parametric sharpening filter.

5. The method of claim 1, further comprising determining parameters of the warp sharpening filter according to an optimization criterion minimizing block prediction errors.

6. The method of claim 1, further comprising:
   determining parameters of the warp sharpening filter with respect to minimizing a block prediction cost function; and
   adding the parameters of the warp sharpening filter to a bitstream of the video codec.

7. The method of claim 1, wherein the first resolution layer image comprises a spatial enhancement layer of a Scalable Video Coding (SVC) video codec and wherein the second resolution layer image comprises a spatial base layer of the SVC video codec.

8. The method of claim 1, wherein the block of the up-scaled second resolution layer image is selected with respect to minimizing a block prediction cost function, among blocks of the up-scaled second resolution layer image surrounding the corresponding block of the up-scaled second resolution layer image.

9. The method of claim 8, further comprising:
   determining the scale factor and a displacement vector representing a displacement of the selected block of the up-scaled second resolution layer image with respect to the corresponding block of the up-scaled second resolution layer image for minimizing a block prediction cost function; and
   adding the scale factor and the displacement vector to a bitstream of the video codec.

10. A spatially scalable video coder for determining predictor blocks of a first resolution layer image from blocks of a second resolution layer image, wherein a resolution of the first resolution layer image is higher than a resolution of the second resolution layer image, and wherein the spatially scalable video coder comprises:
   up-scaling circuitry configured to up-scale each block of the second resolution layer image to a corresponding block of an up-scaled second resolution layer image using a scale factor that is different from a ratio of the resolutions of the first resolution layer image and the second resolution layer image;
   a warp sharpening filter configured to filter a block of the up-scaled second resolution layer image to obtain a filtered block of the up-scaled second resolution layer image;
   selection circuitry configured to select a predictor block of the first resolution layer image from the filtered block with filtering and the block without filtering in the up-scaled second resolution layer image.

11. The spatially scalable video coder of claim 10, wherein the up-scaling circuitry comprises at least one of a first up-scaling circuitry or a second up-scaling circuitry, and wherein the spatially scalable video coder comprises:
   the first up-scaling circuitry configured to up-scale each block of the second resolution layer image to a corresponding block of an up-scaled second resolution layer image representing a first predictor block, wherein a scale factor of the up-scaling corresponds to a ratio of the resolutions of the first resolution layer image and the second resolution layer image; and the second up-scaling circuitry configured to up-scale each block of the second resolution layer image to a corresponding block of an up-scaled second resolution layer image representing a third predictor block.

12. The spatially scalable video coder of claim 11, wherein the warp sharpening filter is configured to filter a block of the up-scaled second resolution layer image representing the first predictor block to obtain a filtered block of the up-scaled second resolution layer image representing a second predictor block, and wherein the selection circuitry is configured to select a predictor block of the first resolution layer image from at least two of the first predictor block, the second predictor block and the third predictor block.

13. The spatially scalable video coder of claim 10, wherein the first resolution layer image comprises a spatial enhancement layer of a Scalable Video Coding (SVC) video codec and wherein the second resolution layer image comprises a spatial base layer of the SVC video codec.

14. The spatially scalable video coder of claim 10, wherein the block of the up-scaled second resolution layer image is selected with respect to minimizing a block prediction cost function, among blocks of the up-scaled second resolution layer image surrounding the corresponding block of the up-scaled second resolution layer image.

15. A spatially scalable video encoder configured to determine for determining predictor blocks of a first resolution layer image from blocks of a second resolution layer image, wherein a resolution of the first resolution layer image is higher than a resolution of the second resolution layer image, and wherein the spatially scalable video encoder comprises:

a warp sharpening filter configured to filter a block of an up-scaled second resolution layer image to obtain a filtered block of the up-scaled second resolution layer image, wherein a predictor block of the first resolution layer image is selected from the filtered block of the up-scaled second resolution layer image and the block of the up-scaled second resolution layer image, and wherein the up-scaled second resolution layer image is up-scaled from the second resolution layer image using a scale factor that is different from a ratio of the resolutions of the first resolution layer image and the second resolution layer image; and a multiplexer configured to output an output signal, and wherein parameters of the warp sharpening filter are included in a bitstream of the output signal.

16. The video encoder of claim 15, wherein parameters of the warp sharpening filter indicate whether the warp sharpening filter is applied or not.

17. The video encoder of claim 15, wherein a scale factor of the up-scaling is included in the bitstream of the output signal.

18. A spatially scalable video decoder for determining predictor blocks of a first resolution layer image from blocks of a second resolution layer image, wherein a resolution of the first resolution layer image is higher than a resolution of the second resolution layer image, and wherein the spatially scalable video decoder comprises:

a demultiplexer configured to receive a received signal, wherein parameters of a warp sharpening filter are included in a bitstream of the received signal; and a warp sharpening filter configured to filter a block of an up-scaled second resolution layer image to obtain a filtered block of the up-scaled second resolution layer image, wherein a predictor block of the first resolution layer image is selected from the filtered block of the up-scaled second resolution layer image and the block of the up-scaled second resolution layer image, and wherein the up-scaled second resolution layer image is up-scaled from the second resolution layer image using a scale factor that is different from a ratio of the resolutions of the first resolution layer image and the second resolution layer image.

19. The video decoder of claim 18, wherein parameters of the warp sharpening filter indicate whether the warp sharpening filter is applied.

20. The video decoder of claim 18, wherein a scale factor of the up-scaling is included in the bitstream of the received signal.

* * * * *

UNITED STATES PATENT AND TRADEMARK OFFICE
CERTIFICATE OF CORRECTION

PATENT NO. : 10,944,966 B2  
APPLICATION NO. : 16/354528  
DATED : March 9, 2021  
INVENTOR(S) : Maxim Sychev Page 1 of 1

It is certified that error appears in the above-identified patent and that said Letters Patent is hereby corrected as shown below:

Claim 15, Column 17, Lines 30 and 31: "video encoder configured to determine for determining" should read "video encoder for determining"

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*